United States Patent [19]
Glöss et al.

[11] Patent Number: 5,424,597
[45] Date of Patent: Jun. 13, 1995

[54] ADJUSTING DEVICE WITH PIEZO DRIVE

[75] Inventors: Rainer Glöss, Karlsbad; Harry Marth, Waldbronn, both of Germany

[73] Assignee: Physik Instrumente (P.I.) GmbH & Co., Waldbronn, Germany

[21] Appl. No.: 208,152

[22] Filed: Mar. 8, 1994

[30] Foreign Application Priority Data

May 7, 1993 [DE] Germany ............ 43 15 238.4

[51] Int. Cl.⁶ .............................................. H02N 2/04
[52] U.S. Cl. ............................................... 310/328
[58] Field of Search .................................. 310/323, 328

[56] References Cited

U.S. PATENT DOCUMENTS

| 4,019,073 | 4/1977 | Vishnevsky et al. | 310/328 |
| 4,613,782 | 9/1986 | Mori et al. | 310/323 |
| 5,036,245 | 7/1991 | Ohnishi et al. | 310/323 |
| 5,039,899 | 8/1991 | Yamaguchi | 310/323 |
| 5,216,313 | 6/1993 | Ohnishi et al. | 310/323 |

FOREIGN PATENT DOCUMENTS

| 0187270 | 9/1985 | Japan | 310/328 |
| 62-58883 | 3/1987 | Japan | 310/328 |

OTHER PUBLICATIONS

*Forschungsberichte Aus Fein–Und Mikrotechhnik*, Institut für Zeitmessechnik, Fein–und Mikrotechnik der Universität Stuttgart, Hahn–Schickard–Institut für Feinwerk–und Zeitmesstechnik Stuttgart, pp. 61, 75 (1991).

Primary Examiner—Thomas M. Dougherty
Attorney, Agent, or Firm—Panitch Schwarze Jacobs & Nadel

[57] ABSTRACT

An adjusting device with a piezo drive is provided with two piezo translators which are brought into functional connection with a driven element by means of a spring element. A transmission of motion occurs corresponding to the change in length of the piezo translators, while resetting of the piezo translators occurs by removing the functional connection through their associated control links. Because of the continuous biasing of the spring element, a secure engagement of the driven element is guaranteed. As a result, the high precision requirements on the control links and their positioning displacements, which would otherwise be necessary for engagement, can be displaced with.

17 Claims, 4 Drawing Sheets

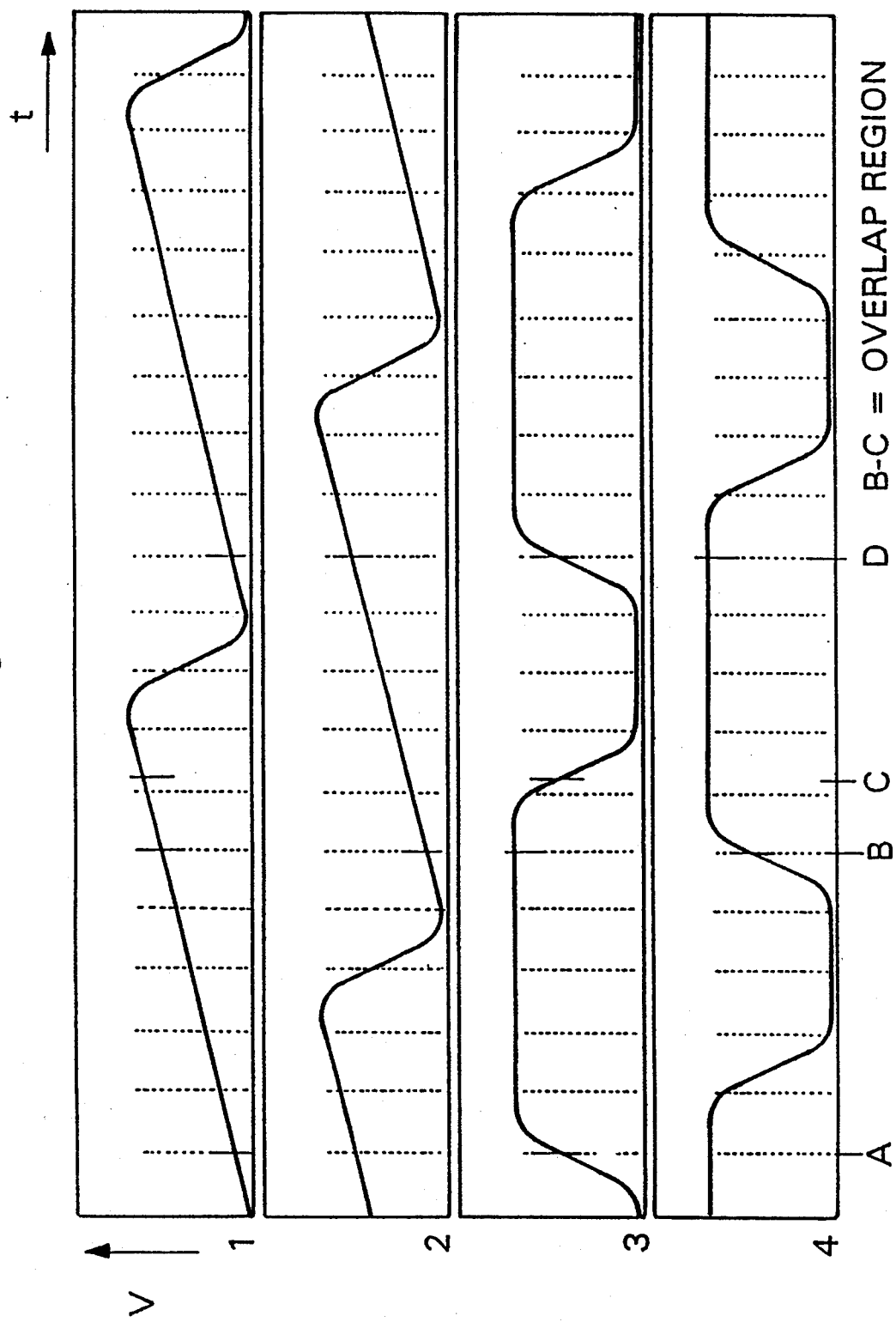

ADJUSTING DEVICE WITH PIEZO DRIVE

FIELD OF THE INVENTION

The invention concerns an adjusting device with a piezo drive, especially for fine mechanical optical devices and similar applications, comprising at least two piezo translators that experience a change in length upon application of an electrical voltage and that engage on an alternating basis a driven element through a functional connection, such that when the functional connection occurs, a transmission of motion to the driven element takes place, while when the functional connection is removed, the piezo translator experiences a resetting movement in preparation for the next transmission of motion, so that the driven element carries out the desired adjusting movement.

BACKGROUND OF THE INVENTION

Known adjusting devices with a piezo drive, for example the linear drives known as "inch-worms", operate on the basis of the clamping principle. Such drives comprise three piezo elements, namely one linear piezo arranged parallel to the driven element and two clamping piezos that are positioned one at each end of the linear piezo and perpendicular to the driven element, and with one fixed in and the other movably supported in the housing.

While the application of an electrical voltage at the clamping piezos brings about a clamping of the driven member, such application at the linear piezo causes a movement of the movable clamping piezo. When this clamping piezo is in a clamped position on the driven element, but the fixed clamping piezo is not, then due to the clamping, the change in length of the linear piezo leads to a transmission of the movement to the driven element. If the fixed clamping piezo is activated and holds the driven element immobile, then when the functional connection of the movable clamping piezo is removed, a change in length of the linear piezo causes a resetting movement in preparation for the next transmission of motion.

In order to achieve a sure clamping and releasing and thus reliable operating performance, the clamping piezos in particular have very high requirements for precision. This effect is increased even more by the fact that piezo actuators in general are able to carry out positioning movements of only a few micrometers. However, since wear and deviations in length as a result of temperature and other environmental influences severely impair the clamping behavior, problems with the operating performance due to faulty or abrupt clamping are unavoidable.

SUMMARY OF THE INVENTION

The present invention achieves the object of further perfecting the adjusting drive described in the Field Of The Invention above, and in particular of developing a miniature drive with a large transverse force, without reverse play, and with resolution in the lower nanometer range. This miniature drive distinguishes itself by a movement that is as uniform as possible and by the fact that it is not sensitive to temperature and environmental influences, and is thus only subject to small requirements for precision in manufacture.

In accordance with this invention, the object is achieved by bringing the piezo translators into functional connection with the driven element through at least one spring element, and by assigning to each piezo translator a control link that removes the functional connection of its piezo translator with the driven element.

This gives rise to the advantage that because of the permanent pressing of the spring element, a sure clamping of the driven element is assured at all times, and there is always at least one piezo translator in functional connection with the driven element. The removal of the functional connection takes place by means of the respective control link, and as a result of this, unavoidable displacement differences can no longer have a negative effect on the quality of the clamping. Since only the relative displacements and not the absolute differences in length of the control links are relevant for the clamping and release, deviations in the length of the control links because of temperature, aging, and environmental influences have no effect on the reliable operating performance of the piezo drive. The control links can therefore be manufactured with lower requirements for precision and thus more cost-effectively as well.

To bring about the functional connection between the piezo translator and the driven element, there are many different possibilities. For one, the spring element can work on the driven element, in which case the driven element is to be designed wide enough that it can be brought into functional connection with both piezo translators simultaneously. With an arrangement of this type, the position of the point of application at the driven element varies depending on the length of the control link, and for this reason the driven element must be mounted and arranged in a movable fashion. Of course, it is also possible instead of a spring element to make use of corresponding flexible force generators, or even to work with the force of gravity alone.

As another possibility, the spring element can work instead on the control links, in which case it is particularly advantageous to mount them on a common base. This ensures that it is always the control link that is the longer one at any given time that is guaranteeing the functional connection, while the piezo translator that is assigned to the shorter control link can carry out its return movement. When this is being done, the common base must maintain its angular position—in general perpendicular relative to the control link displacement, independently of whether and which of the control links is being supplied with voltage. It is therefore important that an adjustment to the base does not lead to any relative movement between the two control links that are lying adjacent to each other on the base, so that the shortening of one control link must necessarily cause the removal of the functional connection between the assigned piezo translator and the driven element.

If the control links bring about the functional connection between their associated translators and the driven element by means of control arms, the clamping movement of the control links can be enlarged, based on leverage (mechanical advantage), through skillful selection of the point of application that is being used. This makes faster and thus more certain clamping possible. When this is done, it is expedient to mount the control arms on a common base, which is acted upon by the spring element. Here as well, the spring element guarantees the pressing against the driven element, and thus the production and maintaining of functional connection with the driven element, while the release of the functional connection takes place on an alternating basis by means of the control links. In order that the control links are kept in functional connection with their control arms, springs are appropriately provided to press the control arms against the control links.

To remove the piezo translators from functional connection with the driven element on an alternating basis with the aid of the control links, various possibilities are available to the artisan. With regard to small regulating displacements, it is advisable to also configure the control links as piezo elements, or as electro- or magnetostrictive elements, since optimum clamping is obtained in this way.

It is particularly advantageous if the control links are connected to a controlling means that removes the functional connection of each individual piezo translator with the driven element only after the functional connection of the driven element with the other piezo translator has been established and this other translator has begun the transmission of motion. In this way, overlap of the adjusting movements of the two piezo translators is assured, and at the critical moment of the change in drive the speed of adjustment remains absolutely uniform. One thus obtains a continuous drive without any interruption in the flow of power, while at the same time avoiding the disadvantage that the desired adjusting movement of the driven element must be interrupted in order to reset a translator. This results in greater adjusting speeds and higher adjusting accuracy.

The piezo translators are also expediently arranged approximately parallel to the driven direction, and work upon the driven element by means of swivel arms so that a mechanical advantage results. When this is done, the swivel arms can be pressed against the piezo translators by additional springs, so that play-free seating can be assured at all times.

Also within the scope of this invention is the connection in parallel of several like-operating piezo translators, so that several translators act upon the driven element simultaneously.

An especially compact and at the same time play-free design results from one translator and its associated control link being fixed together in one monolith. The clamping and adjusting movements are then carried out by a combined element.

In the same way, instead of a separate control link for each piezo translator, a common control link can be provided that works in an alternating fashion on the piezo translators by means of a rocker arm on which the spring element mentioned above acts in the sense of bringing about the functional connection with the driven element. Doing this provides additional assurance that the control links, originating from a common base, carry out the necessary relative movements, while temperature, aging, and other environmental influences have no effect on the clamping.

For a uniform and continuous drive, it is expedient to control the piezo translators with identical linear voltage curves that are staggered in time, whereby each is brought into functional connection with the driven element by means of the associated control link when the change in length brought about by the application of the voltage corresponds to the desired direction of adjustment. Because of the identical speed of the change in length, there is thus no disturbance to the transmission of the movement, even during the overlapping ranges of simultaneous drive.

Additionally within the scope of this invention is the use, in place of the piezo translators, of electro- or magnetostrictive elements that also undergo a defined change in length upon application of an electrical voltage.

Of course, the driven element can also be mounted in a stationary fashion, with the adjusting device itself being moved and carrying out the desired adjusting movements, which would correspond to a kinematic reversal.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1b is a sectional view taken along the line I—I of FIG. 1a;

FIG. 3 is a voltage-time diagram of two piezo translators and two control links;

DETAILED DESCRIPTION OF PREFERRED EMBODIMENTS

Figure 1A:
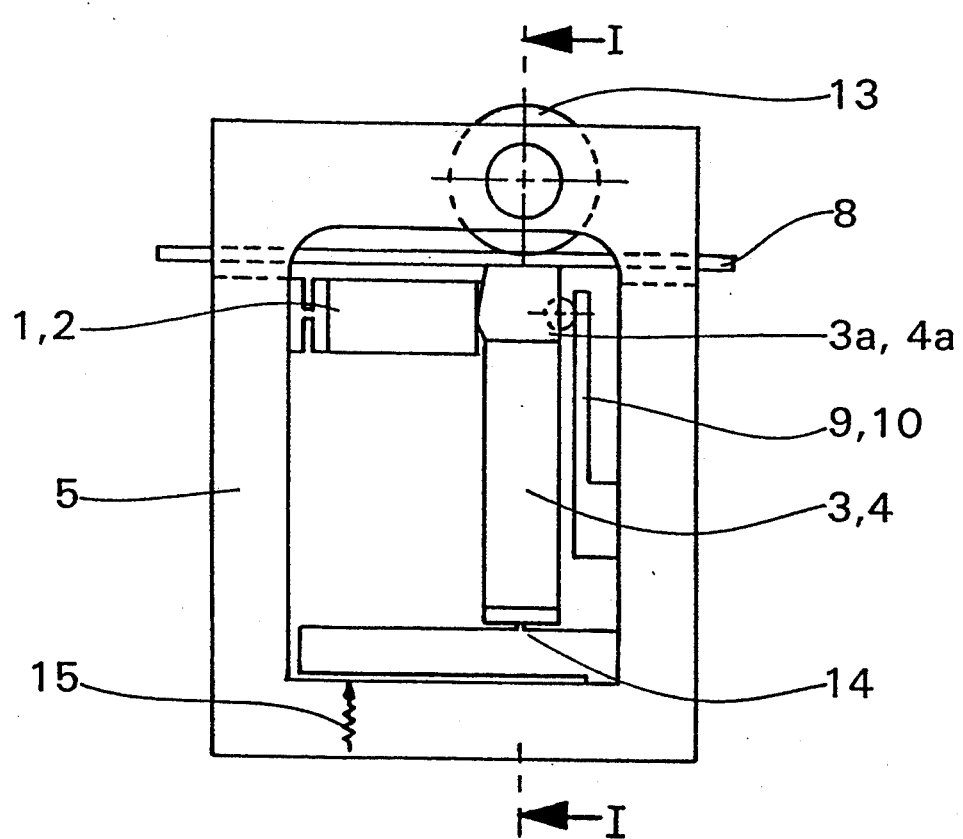
FIG. 1a is a schematic side view of one embodiment of the adjusting device with a piezo drive in accordance with the invention.
Figure 1B:
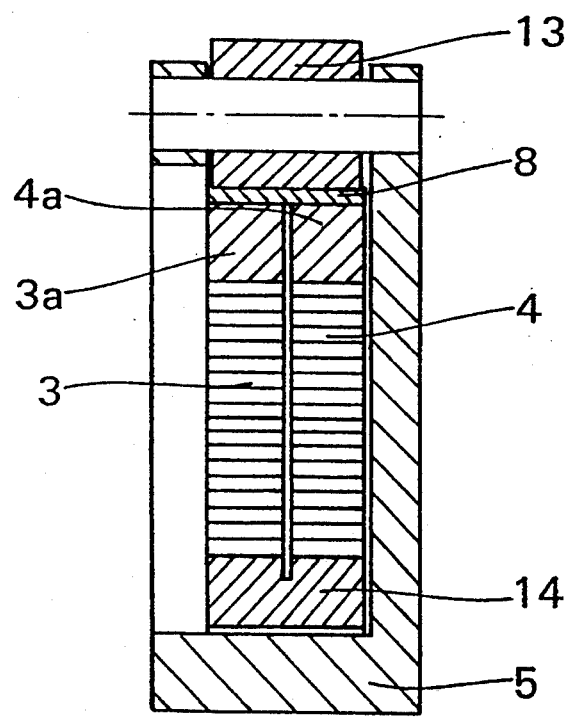

The adjusting device represented in FIGS. 1a and 1b comprises two parallel piezo translators 1 and 2, arranged one behind the other in FIG. 1a, that are arranged parallel to the direction of forward motion of the driven element and that are responsible for the forward motion. Arranged perpendicular to these are two control links 3 and 4, likewise standing one behind the other, that bring about the functional connection to the driven element 8, which is in the form of a band. In FIG. 1a only the front (toward the viewer) piezo translator 1 and the front control link 3 can be seen. The piezo translators 1 and 2, and the control links 3 and 4 as well, experience defined changes in length upon application of electrical voltage.

Both of the piezo translators 1 and 2 are fastened at one of their ends to a common base 5, a part of the housing for example, while with their other ends they act upon extensions 3a and 4a of the links 3 and 4 and in this way achieve functional connection with a driven element 8. Opposite the piezo translators 1 and 2, positioned one behind the other and acting upon the extensions 3a and 4a, are two springs 9 and 10 that provide a play-free positioning, and thus provide a transmission of motion from the piezo translators 1 and 2 to the driven element 8.

Both of the control links 3 and 4 stand on a common base 14. A spring element 15 acts on the underside of this base, and as a result, the control links are pressed in the direction of the driven element 8. A pressure roller 13 ensures the transmission of motion by means of static friction. Through alternating decreases in the length of the two control links 3 and 4, the associated piezo translators 1 and 2 are brought out of functional connection, whereby the piezo translator that was so removed is reset in preparation for the next transmission of motion. Because of the biasing by the spring element 15, and because of the mounting on a common base, influences due to temperature, aging, or other malfunctions are compensated for.

Figure 2:
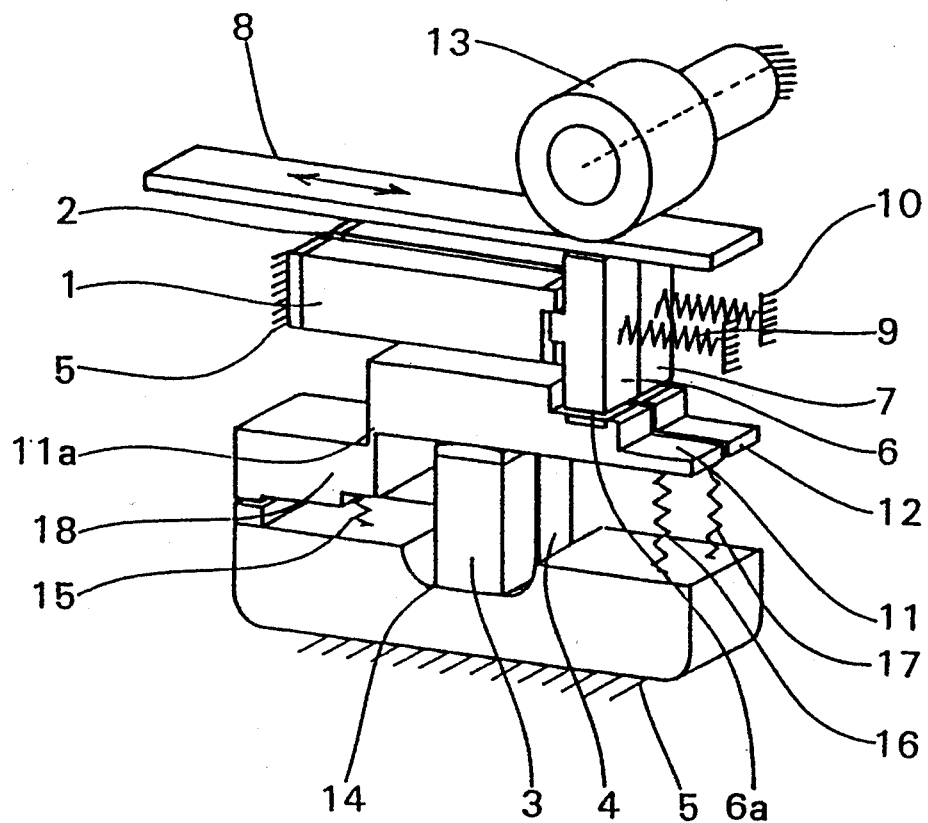
FIG. 2 is a perspective side view of an alternate embodiment according to the invention.

An alternate embodiment is represented in perspective side view in FIG. 2. This piezo drive has additional control arms 11 and 12, which are positioned between the control links 3 and 4 and additional swivel arms 6 and 7, and which extend approximately perpendicular to both. The control arms 11 and 12 are mounted at one of their ends on a common base 18. A spring element 15 in the form of an extension spring acts upon its underside, as a result of which the control arms, at their opposite ends, press the swivel arms 6 and 7 in a direction towards the driven element 8. In order that a decrease in length of one of the two control links 3 or 4 brings about removal the associated swivel arm 6 or 7, additional extension springs 16 and 17 are provided at the respective ends of each of the control arms 11 and 12 that are opposite the base 18. These extension springs 16 and 17 assure a play-free positioning of the control arms 11 and 12 at the control links 3 and 4.

The respective central positioning of the piezo translators 1 and 2 at the swivel arms 6 and 7, which can swivel around a joint 6a and a joint 7a (not shown), and the control links 3 and 4 at the control arms 11 and 12, which can swivel around a point 11a and a point 12a (not shown), cause a doubling of the original control movements due to leverage. Due to the special designs of the levers, the appearance of transverse forces is prevented as well.

The voltage curves of the two piezo translators 1 and 2 and of the two control links 3 and 4 are represented one below the other in FIG. 3. As can be seen from this, the control link 3 comes into functional connection with the driven element at Point A, whereby the piezo translator 1 transmits an adjusting movement that corresponds to its voltage curve. At Point B the control link 4 also comes into functional connection with the driven element, and the piezo translator 2 likewise transmits to the driven element an adjusting movement, and indeed one with the same speed as piezo translator 1, as can be seen from the identical voltage curves of the two piezo translators. Thus, in the following segment between B and C, both piezo translator 1 and piezo translator 2 are found in functional connection with the driven element. It is not until Point C, that is just before piezo translator 1 has reached its maximum extension, that the functional connection of control link 3 with the driven element is removed. The piezo translator 2 then carries out the adjusting movement by itself, and piezo translator 1 is returned to its original position.

Just before the maximum extension of the piezo translator 2, piezo translator 1 comes back into the connection at Point D and takes over the continuing advance, first in conjunction with piezo translator 2 and then by itself. The maximum stepping frequency is of the order of magnitude of 50 to 100 Hz, and the speed of the advance is approximately 1 mm/sec.

Because of the broad overlapping range between B and C, a rapid, continuous and uniform adjusting motion of the driven element is assured. Of course, the adjusting device also functions in the opposite direction, in which case a contraction of the piezo translators is brought about by a corresponding decrease in voltage.

Also within the scope of the invention is the fact that the spring element acts on the pressure roller in the direction of the control links, and thus assures the maintenance of a functional connection between piezo translator and driven element.

Figure 4:
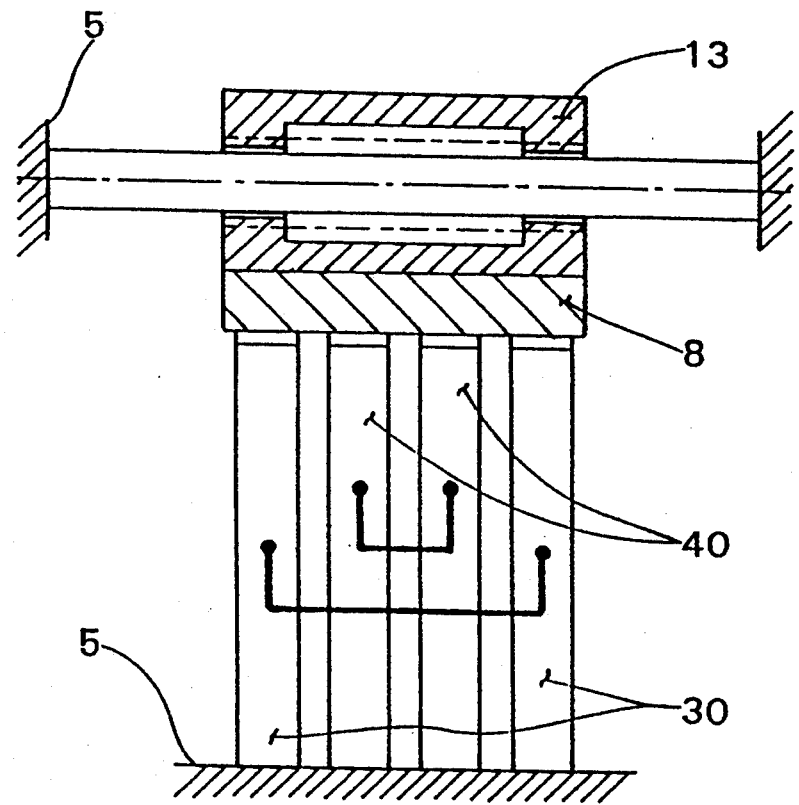
FIG. 4 is a cross-sectional view (similar to FIG. 1a but partially broken away) through another adjusting device according to the invention with control links placed in parallel.

FIG. 4 shows a cross-section through an adjusting device in which the operations are carried out by two pairs of control links 30 and 40, which come as pairs into functional connection with the driven element 8 by means of a spring (not shown). In accordance with this embodiment through a multiple, parallel arrangement of the driven element, piezo translator and control link, the transmission of motion is possible even to wide driven elements.

Figure 5:
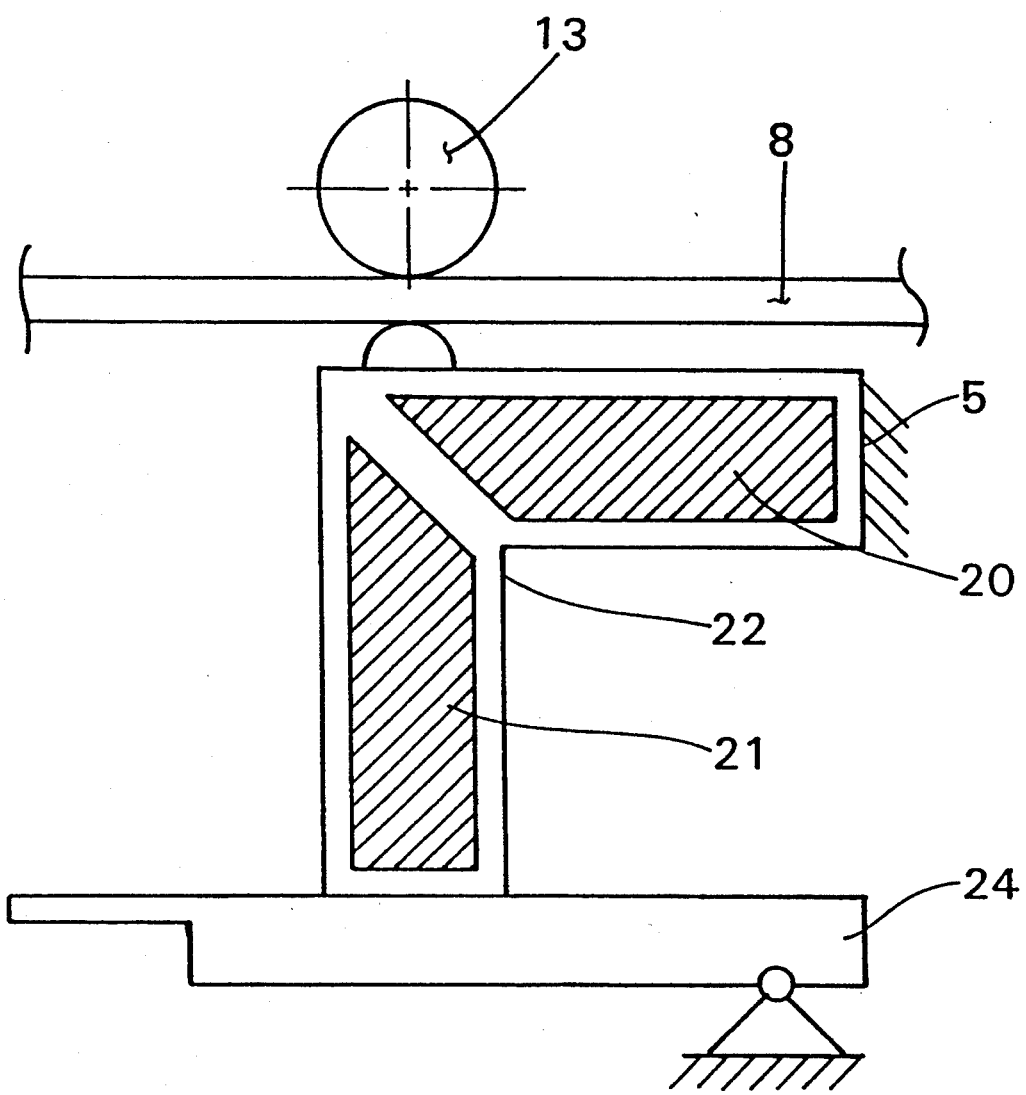
FIG. 5 is a schematic side-view diagram of another adjusting device according to the invention comprising a monolith.

In FIG. 5, an adjusting device is shown in which one piezo translator 20 and one control link 21 are combined in a monolith (unitary structure) 22. In this embodiment the monolith carries out both the advancing movement as well as the clamping movements. Parallel to the monolith 22 there is an additional monolith (not shown), that is mounted on a common spring element 24. The two monoliths are triggered on an alternating basis in such a way that the driven element is displaced uniformly and continuously.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An adjusting device with a piezo drive for fine mechanical optical devices and the like, comprising a base (5), at least two translators (1,2) attached to the base and which experience a change in length upon application of an electrical voltage, said translators being selected from the group consisting of piezo, electrostrictive and magnetostrictive elements, a driven element (8) to which the translators are removably connected on an alternating basis to transmit motion to effect a relative adjusting movement between the base and the driven element in response to the change in length, at least one spring element (15) by which the translators can be brought into functional connection with the driven element, a control link (3,4) assigned to each translator by which the functional connection of the respective translator is removed from the driven element, whereby the transmission of motion from a translator takes place when the functional connection exists, and when the functional connection is removed, the translator experiences a return movement in preparation for the next transmission of motion, and controlling means connected to the control links (3, 4), said controlling means removing the functional connection of each individual translator (1, 2) with the driven element only after the functional connection of the driven element (8) with the other translator (1, 2) has been established, and this other translator has begun the transmission of motion.

2. An adjusting device according to claim 1, wherein the base is mounted in a stationary fashion and the driven element (8) carries out a desired adjusting movement.

3. An adjusting device according to claim 1, wherein the translators (1,2) comprise piezo elements.

4. An adjusting device according to claim 1, wherein the spring element (15) acts on the driven element (8) to bring about the functional connection.

5. An adjusting device according to claim 1, wherein the control links (3, 4) are mounted on a common base (14) and the spring element (15) acts upon this base.

6. An adjusting device according to claim 1, further comprising control arms (11, 12) by which the control links (3, 4) bring about the functional connection of their assigned translators (1, 2) with the driven element (8), said control arms (11, 12) being mounted on a common base (14), and the spring element (15) acting on this base (18).

7. An adjusting device according to claim 6, further comprising springs (16, 17) which press the control arms (11, 12) against the control links (3, 4).

8. An adjusting device according to with claim 1, wherein the control links (3, 4) comprise elements selected from the group consisting of piezo, electrostrictive and magnetostrictive elements.

9. An adjusting device according to with claim 1, wherein the translators (1, 2) are arranged approximately parallel to the direction of adjusting movement.

10. An adjusting device according to claim 1, wherein the translators (1, 2) have swivel arms (6, 7) assigned thereto which act on the driven element (8).

11. An adjusting device according to claim 10, wherein the swivel arms (6, 7) are pressed against the translators (1, 2) by additional springs (9, 10).

12. An adjusting device according to claim 1, further comprising additional translators (30, 40), acting in the same way as translators (1, 2) and connected in parallel.

13. An adjusting device according to claim 1, wherein the translators (1, 2) are electrostrictive or magnetostrictive elements.

14. An adjusting device according to claim 1, wherein each translator (20) and its assigned control link (21) are combined on one monolith (22).

15. An adjusting device according to claim 1 wherein said control links (3, 4) form a common control element having a rocker arm that acts on the translators (1, 2) in an alternating fashion.

16. An adjusting device according to claim 1, further comprising control means for the translators (1, 2), said control means generating identical linear voltage curves that are staggered in terms of time, whereby the translators are brought into functional connection with the driven element (8) by means of the assigned control links (3, 4) when the change in length of the translators brought about by application of a voltage corresponds to a desired direction of adjusting movement.

17. An adjusting device according to claim 1, wherein the driven element (8) is mounted in a stationary fashion, and the adjusting device carries out a desired adjusting movement.

* * * * *